United States Patent [19]

Craun et al.

[11] Patent Number: 5,470,906
[45] Date of Patent: Nov. 28, 1995

[54] ODOR FREE, AIR DRY, DECORATIVE LATEX PAINTS

[75] Inventors: Gary P. Craun, Berea; George S. Rosekelly, Lakewood, both of Ohio; F. Louis Floyd, Silver Spring, Md.

[73] Assignee: The Glidden Company, Cleveland, Ohio

[21] Appl. No.: 173,069

[22] Filed: Dec. 27, 1993

[51] Int. Cl.$^6$ ............................. C08L 67/00; C08L 75/00
[52] U.S. Cl. ..................... 524/507; 524/508; 524/513; 524/514; 528/502; 528/503
[58] Field of Search ...................................... 524/502, 507, 524/508, 513, 514, 556, 563, 564; 528/502, 503

[56] References Cited

U.S. PATENT DOCUMENTS

| | | | |
|---|---|---|---|
| 3,953,386 | 4/1976 | Murphy et al. | 524/716 |
| 4,011,388 | 3/1977 | Murphy et al. | 526/320 |
| 4,085,082 | 4/1978 | Lamb et al. | 524/564 |
| 4,210,565 | 7/1980 | Emmons | 524/564 |
| 4,373,054 | 2/1983 | Gibson et al. | 524/460 |
| 5,204,404 | 4/1993 | Werner, Jr. et al. | 524/507 |
| 5,326,808 | 7/1994 | Floyd et al. | 524/513 |

*Primary Examiner*—Tae H. Yoon
*Attorney, Agent, or Firm*—Thomas M. Schmitz

[57] ABSTRACT

An aqueous ambient dry paint coating based on an emulsion copolymerized addition polymer containing an oligomer selected from a polyurethane or a polyester having a Tg below −20° C. and a number average molecular weight between 300 and 5,000, where the coating is free of organic coalescing solvents. The matrix addition polymer is combined with an oligomer produced by forming an aqueous micro-preemulsion of oligomer in water by high shear mixing of oligomer and water containing 40% to 70% by weight oligomer and at temperatures between about 20° C. and 100° C. to provide an aqueous pre-emulsion having an organic phase droplet size less than 10 microns.

8 Claims, No Drawings

ODOR FREE, AIR DRY, DECORATIVE LATEX PAINTS

This invention pertains to air dry emulsion paints based on emulsion polymeric binders and more particularly to odor-free, consumer latex paints free of polluting offensive odoriferous coalescing solvents. This invention relates to commonly assigned pending patent application Ser. No. 019,633 filed Feb. 18, 1993.

BACKGROUND OF THE INVENTION

Paint coatings are surface protective coatings applied to substrates and dried to form continuous films for decorative purposes as well as to protect the substrate. Consumer paint coatings are air-drying aqueous coatings applied primarily to architectural interior or exterior surfaces, where the coatings are sufficiently fluid to flow out, form a continuous paint film, and dry at ambient temperatures to protect the substrate surface. A paint coating ordinarily comprises an organic polymeric binder, pigments, and various paint additives. In dried paint films, the polymeric binder functions as a binder for the pigments and provides adhesion of the dried paint film to the substrate. The pigments may be organic or inorganic and functionally contribute to opacity and color in addition to durability and hardness, although some paint coatings contain little or no opacifying pigments and are described as clear coatings. The manufacture of paint coatings involves the preparation of a polymeric binder, mixing of component materials, grinding of pigments in a dispersant medium, and thinning to commercial standards.

Latex paints for the consumer market ordinarily are based on polymeric binders prepared by emulsion polymerization of ethylenic monomers. A typical consumer latex paint binder contains a vinyl acetate copolymer consisting of polymerized vinyl acetate (80%) and butyl acrylate (20%). The hardness of the latex polymer must be balanced to permit drying and film formation at low application temperatures, which requires soft polymer units, while at the same time the polymer must be hard enough in the final film to provide resistance properties which requires hard polymer units. This is conventionally accomplished by designing a latex polymer with a moderately elevated Tg (glass transition temperature) but then lowering the Tg temporarily with a volatile coalescing solvent. Coalescing solvents function to externally and temporarily plasticize the latex polymer for time sufficient to develop film formation, but then diffuse out of the coalesced film after film formation, which permits film formation and subsequent development of the desired film hardness by the volatilization of the coalescent. Internal plasticization is based on coreaction of soft monomers with hard monomers to form a polymeric copolymer binder, such as 80/20 vinyl acetate/butyl acrylate, to obtain the desired film forming characteristics. If a lower Tg copolymer is used without a coalescing solvent, higher levels of soft comonomer are required to achieve a lower Tg, but then the final dried film would be undesirably soft, excessively tacky, readily stain, and readily pick up dirt.

A significant source of residual odor in latex consumer paints is directly due to the coalescing solvent. Coalescing solvents are typically linear (or slightly branched) glycol ethers and esters of 7 to 12 carbon atoms in length, which have boiling points typically above 200° C., and solubility parameters appropriate for the latex of interest. One typical coalescing solvent ordinarily contained in commercial latex paints is 2,2,4-trimethylpentanediol monoisobutyrate (Texanol® Eastman Chemical Co.). The odor associated with the gradual volatilization of this solvent is considered objectionable by consumers. Quite often the odor lingers for days or weeks after the paint is applied and dried. All useful coalescing solvents are volatile and have similar objectionable characteristics. An additional deficiency in conventional exterior latex paints is the decline in crack resistance of the dried paint film approximately proportional to the evaporation of the coalescing solvent. While better coalescing solvents have a retention time of about one year in dried paint films, cracking starts to progressively appear after one year in dried paint films. Hence, the elimination of coalescing solvents, attendant objectionable odors, air pollution caused by volatile organic compounds (VOC), and film cracking deficiencies all represent a technical and marketing advance in the state of the art of consumer latex paints.

In polymer technologies unrelated to air-dry vinyl acetate latex paints, preformed polymers have been dispersed into monomers and emulsified in water, whereupon the monomers are then polymerized, such as disclosed in U.S. Pat. No. 4,373,054 pertaining to cathodic electrocoating, or in U.S. Pat. No. 4,313,073 pertaining to alkyd prepolymers; or U.S. Pat. No. 4,588,757 pertaining to laminating adhesives, or in U.S. Pat. Nos. 3,953,386 and 4,011,388 pertaining to aqueous emulsion blends containing cellulosic ester/acrylic polymers.

In said commonly assigned Ser. No. 019,633 filed Feb. 18, 1993, certain non-volatile softening oligomeric modifiers were found compatible with a polyvinyl acetate matrix polymeric binder in a consumer latex paint can be retained in the dried paint film permanently. Softening oligomers were incorporated into the paint where the oligomer was retained permanently in the final paint film. The wet paint does not generate an odor or otherwise emit VOC's while drying nor does a residual odor emit from the dried paint film. The softening oligomeric modifiers were found to externally modify the polyvinyl acetate but did not become coreacted with the polyvinyl acetate polymeric binder. The softening oligomeric modifiers were found to function by a chain-spacing mechanism to soften the polyvinyl acetate polymers whereby the oligomeric modifiers provide low temperature film formation and tack-free films less prone to soiling at a given hardness and/or flexibility than ordinarily possible. The discovery enabled the use of essentially all hard polymer units of polyvinyl acetate without the need for internal plasticization (coreaction) with soft butyl acrylate polymeric units.

According to the process of said Ser. No. 019,633 filed Feb. 18, 1993, a compatible organic solution of oligomeric modifier in ethylenic monomer was subjected to high energy shear to advantageously prepare a sub-micron size organic phase dispersed into water. Subsequent polymerization of the micronized monomer droplets produced a softened modified latex very different from conventional emulsion or suspension polymerization polymers. This process provided an excellent micro suspension polymer and was thought to be necessary to accomplish sub-micron aqueous emulsification of the monomer containing the dissolved oligomeric modifier, since the oligomer was found not readily diffuse during polymerization from particle to particle across the aqueous phase.

It now has been found that a low molecular weight oligomer can be surprisingly dispersed by high shear into water under heat and pressure to provide a submicron emulsified aqueous mixture of oligomer stably dispersed in water. The micro-emulsified mixture in turn, can be readily mixed with various emulsion latex polymers to provide a stable mixture of dissimilar emulsions. It was found that micro-emulsions of oligomer in water having an average droplet size less than about one micron enable the oligomer particle to migrate out of the oligomer droplets then through the aqueous phase and into surrounding latex polymer particles if the oligomer is sufficiently low molecular weight oligomer. The lowest molecular weight oligomer particles move faster due to micro small size and have a small but finite solubility in water. A medium range molecular weight fraction of the low molecular weight oligomers move through the water phase into the latex particles at a slower rate extending over several hours or even a few days. The higher molecular weight fraction of the low molecular weight oligomer have essentially zero solubility in water and invariable remain within the oligomer emulsion droplets until a paint film dries, at which time these oligomer particles physically contact the latex particles and eventually migrate into the latex polymer particles during drying.

In accordance with the process of this invention, low molecular weight oligomer having a number average molecular weight below about 5,000 is stably dispersed into water assisted with surfactants by heating a mixture of oligomer and water containing by weight between about 40% and 70% oligomer at temperatures preferably between about 45° C. and 60° C., and then micronizing the heated oligomer water mixture under substantial shear to provide the stable microemulsion of oligomer dispersed aqueous emulsion having an average microemulsion droplet size less than about ten microns. The resulting oligomeric preformed microemulsion can be blended with a wide variety of latex polymers to provide a polymeric binder for paint coatings. Preferred oligomers are non-volatile oligomers having a molecular weight between about 300 and 5,000. Lower molecular weight compounds tend to be volatile and cause excessive plasticizer migration while higher molecular weight polymers lose low temperature film-forming and softening effects.

The principal advantage of this invention is the elimination of the odor and VOC associated with volatile coalescent solvents which are intentionally volatile and intended to migrate out of the dried paint film. An additional advantage pertains to dried paint films exhibiting superior toughness obtained through the use of a hard matrix polymer balanced with the oligomeric modifier to accommodate softening through the external addition of softening modifier while retaining the desired dried film hardness. A further advantage pertains to lower net cost for both interior and exterior paints since high cost soft monomers can be avoided. Volatile coalescing agents can be eliminated and binder volume can be increased by using a permanent non-volatile softening oligomer instead of a volatile coalescent. Other volatile organic solvents can be eliminated enabling a zero VOC coating. The resulting dried paint films exhibit a superior balance of hardness and flexibility while maintaining long term resistance and flexibility. These and other advantages of this invention will become more apparent by referring to the detailed description and illustrative examples.

SUMMARY OF THE INVENTION

Briefly, the air-dry emulsion paint of this invention contains an oligomeric modified binder of polymerized ethylenic monomers preferably comprising an emulsion latex polymeric binder externally modified with a non-reactive, low molecular weight, compatible oligomer selected from a polyester-urethane copolymer, a polyether-urethane copolymer, a polyurethane-urea copolymer, a polyester-amide, or a polyester, where between 3% and 30% by weight of the binder comprises softening oligomer added to the emulsion polymeric matrix polymer. In accordance with the process of this invention, low molecular weight softening oligomer having a preferred number average molecular weight between 300 and 5,000 is effectively emulsified into water assisted by stabilizing surfactants at temperatures between 20° C. and 100° C., preferably between about 45° C. and 60° C., and at very high shear to produce a stabilized emulsion mixture containing by weight between about 40% and 70% dispersed oligomer. The oligomer emulsion is then blended with emulsion latex polymer to provide an oligomer-modified polymeric binder.

DETAILED DESCRIPTION OF THE INVENTION

The air-dry emulsion paint of this invention comprises a preemulsion containing a non-volatile oligomeric modifier stably dispersed into water blended with an emulsion polymer to form a binder for the paint coating.

Suitable oligomeric modifiers in accordance with this invention comprise low molecular weight oligomers including urethanes consisting of polyester-urethane copolymers, polyether-urethane copolymers, polyurethane-urea copolymers; polyester polymer comprising polyester-amides and polyester polymers. The foregoing softening oligomeric modifiers function as effective external modifiers for latex emulsion paints.

Useful non-volatile oligomeric modifiers have a number average molecular weight range between about 300 and 5,000, preferably between 500 and 2,000. A preferred characterization of the oligomer modifier is in units of degree of polymerization (DP Units) which refers to the repeating monomer units without regard to molecular weight although the molecular weight is maintained relatively low as indicated. DP units defines the approximate chain length of the oligomers without regard to side units. The oligomeric modifier of this invention should have a DP between about 2 and 100, preferably between 2 and 50 and most preferably between 2 and 20 DP units. Useful oligomer modifiers have low Tg's to sufficiently impart a plasticizing effect on the matrix polymer. Useful Tg's of the oligomeric modifier measured by Differential Scanning Calorimetry (DSC) at 10° C./minute scan rate are less than −20°, preferably less than −40° C. and most preferably below −50° C. The level of oligomer modifier needed can vary considerably in the final latex. The level required depends on the inherent softening efficiency of the oligomer (estimated by its Tg) and the Tg of the matrix (parent) polymer. The Fox equation is useful for estimating the level needed:

$$1/T_g \text{ (mix)} = (W_p/T_{g,p}) + (W_m/T_{g,m})$$

where $T_g$ (mix)=glass transition temperature of the modified polymer (which is a mixture);

$W_p$, $W_m$=weight fraction of the parent (matrix) polymer and oligomeric modifier, respectively;

$T_{g,p}$; $T_{g,m}$=glass transition temperature of the parent (matrix) polymer and the oligomeric modifier, respectively.

Thus, the level of oligomeric modifier required is directly related to the Tg of the matrix emulsion polymer, and inversely related to the Tg of the oligomer. Hence, the lower oligomer Tg will more efficiently soften the matrix polymer provided the oligomer and matrix polymer are compatible.

Compatibility of a polymeric mixture is commonly said to exist when the mixture remains substantially optically clear, which indicates the two components are mutually soluble. In this invention, compatibility is intended to mean that the oligomeric modifier is soluble in the matrix polymer in the solid state. Complete compatibility is believed to exist when these conditions are met: in the solid state the mixture has a Tg (DSC, DMA) intermediate between the Tg's of the two components; the absence of component Tg transitions; the mixture Tg is smoothly dependent on level of modifier; and the mixture Tg follows a mixing rule such as the Fox equation. Tg's of mixtures depend on the Tg's of the two components, concentrations of the two components, and compatibility of the two components. The present invention pertains to substantially compatible components.

In accordance with this invention, low molecular weight polyurethane oligomers such as polyester-urethanes, polyether-urethanes, polyether urethane-urea copolymers, and polyester polymers including polyester-amide copolymers can be utilized as external softening oligomers in the polyvinyl acetate binder matrix polymers. Useful polyurethane copolymers typically contain urethane groups in the polymer backbone and are produced by reacting excess equivalents of diol or polyol with lesser equivalents of di- or polyisocyanate. The polyisocyanates can be di- or triisocyanates such as for example 2,4- and 2,6- toluene diisocyanate, phenylene diisocyanate; hexamethylene or tetramethylene diisocyanate, 1,5-naphthalene diisocyanate, ethylene or propylene diisocyanate, trimethylene or triphenyl or triphenylsulfone triisocyanate, and similar di- or triisocyanates. The polyisocyanate can be generally selected from the group of aliphatic, cyclo-aliphatic and aromatic polyisocyanates such as for example hexamethylene 1,6-diisocyanate, isophorone diisocyanate, diisocyanate, 1,4-dimethyl cyclohexane, diphenylmethane diisocyanate 2,4-toluene diisocyanate, 2,6-toluene diisocyanate and mixtures thereof, polymethylene polyphenyl polyisocyanate.

Polyester-urethanes can be produced from diols comprising hydroxyl functional polyester polymer prepared by conventional esterification polymerization techniques from the common dicarboxylic acids and dihydroxyl functional reactants. Suitable carboxylic acids include adipic acid, succinic acid and anhydride, azelaic acid, maleic acid and anhydride, and other aliphatic carboxylic acids. Aromatic dicarboxylic acids include isophthalic acid, phthalic acid and anhydride, terephthalic acid, trimelitic anhydride and the like. Lesser amounts of mono-functional acids can be included, such as benzoic acid, 2-ethylhexanoic acid, if desired. Suitable dihydroxy functional materials include ethylene and propylene glycol, dipropylene glycol, diethylene glycol, neopentyl glycol, trimethylol propane, and lesser amounts of mono-functional alcohols such as benzyl alcohol and hexanol, if desired. Polyester prepolymers are generally prepared with excess hydroxyl functionality-at molecular weights ranging from about 300 to 5,000 preferably between about 300 and 1,000. Polyester prepolymers can be used alone or in combination with polyethers as hydroxyl functional prepolymers. Suitable hydroxyl functional polyether prepolymers include polyethylene oxide, polypropylene oxide, polybutylene oxide, and tetramethylene oxide where the polyether prepolymers have a molecular weight between about 300 and 5,000.

The polyesters and/or polyether prepolymers are then reacted with diisocyanate to advance the prepolymers to a molecular weight preferably between 300 and 5,000 to form polyester or polyether urethane oligomers of this invention. Diisocyanates are used preferably at an equivalent ratio of about 1 isocyanate group to 1.1 to 10 hydroxyl groups. Ratios of about 1.5 to 3 hydroxyl groups per isocyanate group are preferred. Preferred diisocyanates include toluene diisocyanate, isophorone diisocyanate, 1,6-hexane diisocyanate, diphenylmethane diisocyanate, and the like. Catalysts such as dibutyltindilaurate, tin oxide and the like can be used to increase the isocyanate reaction rate with the hydroxyl polyester or polyether prepolymer at temperatures of about 30° to 120° C. and preferably at about 70° to 100° C.

The polyester or polyether urethane copolymers can be further extended with diamine or polyamine, if desired, to produce polyurethane-urea copolymer useful as a softening oligomer modifier in polyvinyl acetate binder matrix polymers in accordance with this invention. In this regard, primary diamine or polyamine can be added to an isocyanate terminated polyurethane intermediate containing unreacted pendant or terminal isocyanate groups obtained by reacting excess equivalents of isocyanate relative to hydroxyl equivalents in the polyester or polyether prepolymers. The primary diamines readily react with the isocyanate functional intermediate to chain extend the polyurethane to a polyurethaneurea of a higher molecular weight. Alternatively amine can be prereacted with the diisocyanate prior to reacting with polyol. Suitable primary amines for chain extension include hexamethylene diamine, 2-methyl-pentanediamine and similar aliphatic diamines. Polyester and polyether urethane copolymers or polyurethanes extended with diamine to form polyurethane-ureas exhibit excellent compatibility with vinyl acetate monomers as well as the resulting polyvinylacetate polymers. Polyurethane intermediate molecular weights before chain extension can be between 200 and 2,000 while after chain extension with the diamine the final molecular weight of the polyurethane-urea can be between about 300 and 5,000.

A particularly preferred non-reactive oligomer useful as a softening oligomer modifier in this invention comprises a polyester polymer. Useful polyester oligomers comprise esterification reaction products of diols with dicarboxylic acids or a functional equivalent with minor amounts of polyol or polyacid if desired, to produce a low acid number polyester polymer. Suitable esters and polyesters for blending have molecular weights between about 300 and 5,000 and include the linear and branched esters and polyesters formed from saturated dicarboxylic acids such as adipic acid, glutaric acid, succinic acid, and other such linear aliphatic acids, acid anhydrides, and lower alkyl esters thereof; phthalic acid, isophthalic acid, trimellitic anhydride, and other aromatic acids, acid anhydrides, and lower alkyl esters thereof; monoacids such as benzoic acid, 2-ethylhexanoic acid and other aromatic and aliphatic acids, which if desired, may be used in minor amounts to end cap and limit molecular weight.

Diol functional materials include diethylene glycol, neopentyl glycol, 2-methyl pentane diol, ethylene glycol, butylene glycol, propylene glycol, dipropylene glycol and the like; or mono-functional glycol ether groups, such as butylcellosolve, butyl carbitol, and the like; as well as hydroxy acids such as lactic acid, and lesser amounts of triols and polyols, such as trimethylol propane and ethane, and pentaerythritol. Acids can be used in carboxyl form, anhydride form, or an ester form, such as the methyl ester form, with the above diols to form linear and branched polyesters desirably having an Acid No. below about 20, and a molecular weight between 300 and 5,000, and preferably between about 500 and 2,000. Polyesters of diethylene or dipropylene glycol with adipic acid are preferred. The low molecular weight esters and polyesters lower the Tg of the blend and can eliminate the need for expensive comonomers such as butyl acrylate. Thus, low molecular weight esters and polyesters can be effectively used to provide excellent, nontacky, paint films without the inclusion of coalescing solvents.

Polyester amide oligomeric modifiers are formed by the reaction of diols and diamines with dicarboxylic acids or esters. In a preferred process, methyl esters of adipic, glutaric, isophthalic or other common dicarboxylic acids are transesterified with diols and diamines at about 150° C. to 250° C. in the presence of common esterification catalysts such as butylstanoic acid. Typically greater amounts of diols, such as diethylene and dipropylene glycol, neopentyl glycol and the like are used with lesser amounts of diamines, such as 1,6-hexanediamine, 2-methyl pentanediamine, or the longer chain amines (e.g. Jeffamine-Texaco). Lesser amounts of monoacids, monoesters, alcohols and amines, or polyacid, polyols, or polyamines can be added, if desired.

In accordance with this invention, it has been found that very low molecular weight oligomer modifier can be dispersed into water under high shear at temperatures between about 20° C. and 100° C. and preferably between about 45° C. and 60° C., where the oligomer weight percent and the oligomer weight in the resulting emulsion is between about 40% and 70% by weight and most preferably between about 55% and 65% by weight oligomer. It has been found that high shear of the oligomer in water under these parameters produces micronized emulsion droplets having a micronized particle size below 10 microns will enable the low molecular weight oligomer to diffuse from the preformed emulsion into a preformed latex emulsion polymer. Preferred microemulsions have an average particle droplet size between 0.1 and 1 micron. The rate of diffusion increases considerably by small preemulsion particles where the rate of diffusion is particularly fast and efficient for preformed emulsions having a particle size preferably between 0.1 and 1 micron. It has been found that efficient and complete diffusion of the low molecular weight oligomer particles can be achieved with preferred submicron emulsion particles, whereby oligomer present sufficiently diffuses into the latex particles to avoid any residual tackiness which may result from higher molecular weight residues that could not readily diffuse into the latex matrix polymer particles. Accordingly, it has been found that oligomer having a more preferred number average molecular weight below 1500 and most preferably between 500 and 1000 not only increase the quantity of oligomer diffusion, but increases diffusion efficiency into the latex matrix particles and advantageously avoids tacky film forming polymer binders. Thus, direct micronized emulsification of the oligomer into an aqueous micro-preemulsion enables the micronized preemulsion to be easily blended with a wide variety of latex emulsion matrix polymers. The resulting diffused oligomer modified latex matrix polymer comprises a plasticized latex emulsion polymer containing modifying oligomer but contains no volatile organic matter. Paint films are capable of achieving both low temperature film formation below about 10° C. and tack free surfaces at ambient room temperature air dry conditions.

In accordance with this invention, the three-dimensional solubility parameters of the oligomeric modifier must match well with that of the latex polymer in order for plasticization to occur, which may describe a boundary for this invention in term of hydrophobicity. For example, a butyl acrylate/ styrene copolymer latex would require a much more hydrophobic modifier than a vinyl acetate homopolymer. In turn, the ability of the oligomeric modifier to diffuse from the microemulsion to the latex polymer should decline with decreasing hydrophobicity. This could be counteracted to some extent by reducing molecular weight although oligomeric molecular weight above about 300 are needed to maintain permanency and zero VOC conditions.

The oligomer preemulsion can be formed in accordance with this invention by forming a normally incompatible mixture of water and oligomer comprising between about 40% and 70% by weight oligomer. The oligomer can be suspended in water with mixing to form a coarse suspension using the common latex surfactants or stabilizers, such as the sulfosuccinates, the sulfates, various ethoxylated phenols, and the like. The coarse suspension is then micronized under very high shear to very fine particle size emulsion droplets of average size of less than 10 microns, preferably less than 1 micron, and most preferably less than 0.7 micron. High mechanical shear and/or ultrasound as well as other high shear devices can be used to form the microemulsion. Grinding the oligomeric modifier into an aqueous mixture of pigments is a satisfactory method of forming the micropreemulsion. Suitable surfactants are used at about 0.1% to 5% by weight (based on solids) and include the nonionic surfactants such as various ethoxylated phenols, block copolymers of ethylene oxide and propylene oxide, anionic surfactants such as sulfosuccinates, sulfates, and sulfonates, and the like (sulfosuccinates such as hexyl, octyl, and hexadecyl sulfosuccinate are preferred). Suitable surfactants include the various sulfosuccinates such as hexyl, octyl, and hexadecyl sulfosuccinate, the various alkyl and alkyl-aromatic sulfates and sulfonates, as well as the various nonionic ethylene oxide surfactants.

In accordance with this invention, the modifying oligomers are dispersed into water and micronized into a microemulsion, whereupon the oligomer micro-preemulsion can be mixed with an emulsion latex copolymer of copolymerized ethylenic monomers. The preferred ethylenic monomer is vinyl acetate which can be homopolymerized or copolymerized with other ethylenic monomers to produce a copolymer containing by weight less than 60% and preferably less than 30% and most preferably less than 20% other ethylenic monomer. Vinyl acetate homopolymer and copolymers are particularly useful for interior latex paints while acrylic homopolymer and copolymers with styrene are particularly useful for exterior latex paints. Polymerizable ethylenically unsaturated monomers contain carbon-to-carbon unsaturation and include vinyl monomers, acrylic monomers, allylic monomers, acrylamide monomers, and mono- and dicarboxylic unsaturated acids. Vinyl esters include vinyl propionate, vinyl laurate, vinyl decanoate, vinyl butyrates, vinyl benzoates, vinyl isopropyl acetates and similar vinyl esters; vinyl aromatic hydrocarbons include styrene, methyl styrenes and similar lower alkyl styrenes, chlorostyrene, vinyl toluene, vinyl naphthalene and divinyl benzene; vinyl aliphatic hydrocarbon monomers include vinyl chloride and vinylidene chloride as well as alpha olefins such as ethylene, propylene, isobutylene, as well as conjugated dienes such as 1,3 butadiene, methyl-2-butadiene, 1,3-piperylene, 2,3-dimethyl butadiene, isoprene, cyclohexane, cyclopentadiene, and dicyclopentadiene; and vinyl alkyl ethers include methyl vinyl ether, isopropyl vinyl ether, n-butyl vinyl ether, and isobutyl vinyl ether. Acrylic monomers include lower alkyl esters of acrylic or methacrylic acid having an alkyl ester portion containing between 1 to 12 carbon atoms as well as aromatic derivatives of acrylic and methacrylic acid. Useful acrylic monomers include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecyl acrylate and methacrylate, benzyl acrylate and methacrylate, and various reaction products such as butyl, phenyl, and cresyl glycidyl ethers reacted with acrylic and methacrylic acids, hydroxyl alkyl acrylates and methacrylates such as hydroxyethyl and hydroxypropyl acrylates and methacrylates, amino acrylates, methacrylates as well as acrylic acids such as acrylic and methacrylic acid, ethacrylic acid, alpha-chloroacrylic acid, alpha-cycanoacrylic acid, crotonic acid, beta-acryloxy propionic acid, and beta-styrl acrylic acid. Particularly preferred comonomers include acrylates such as methyl, ethyl, propyl, butyl (linear and branched), 2-ethyl hexyl; methacrylates such as methyl, ethyl, propyl, butyl (linear and branched), 2-ethyl hexyl; vinyl esters such as acetate, proprionate, butyrate, pentanoate (neo 5), nonanoate (neo 9), 2-ethyl hexanoate, decanoate (neo 10); and other ethylenic monomers such as ethylene, vinyl chloride, vinylidene chloride and butadiene. Very minor amounts of divinyl monomers such as divinyl benzene can be copolymerized if desired.

The emulsion polymerized ethylenic monomers produces a matrix polymer of polymerized vinyl acetate monomer where the most preferred polymeric binders comprise homopolymers of vinyl acetate. On a weight basis, the polymeric binders comprise between 40% and 100% polymerized vinyl acetate with the balance being other ethylenic monomers. Preferred polymeric binders contain at least 70% by weight polymerized vinyl acetate and most preferred 80% to 100% vinyl acetate. For exterior latex paints, acrylic emulsion matrix copolymers copolymers predominantly of copolymerized acrylic and styrene monomers comprising between 50% and 100% by weight acrylic are particularly useful for exterior air dry latex paints. Vinyl acetate copolymers are useful for exterior paints although acrylic copolymer are preferred.

The number average molecular weight of the matrix emulsion polymer should be between about 30,000 and 10,000,000 and preferably between 50,000 and 1,000,000 as measured by GPC (gel permeation chromatography) according to ASTM D3016-78, D3536-76, and D3593-80. Acrylic homopolymer and copolymer latexes will commonly have a higher molecular weight gel fraction which may comprise up to about 50% of the acrylic polymer. The Tg or softening point of the modified polymeric binder particles should be less than 20° C. as measured by differential scanning calorimetry, preferably less than 10° C., most preferably <5° C. The MFT (minimum film formation temperature) is an alternative measure of polymer film formation determined on the neat latex on a temperature gradient temperature bar, and is typically a few degrees higher than the Tg of the latex. MFT should be less than 20° C., preferably less than 15° C., most preferred less than 10° C. The LTFF (low temperature film formation) is a film forming test run on the fully formulated paint. LTFF typically is reported as the lowest temperature at which no cracking is observed, or alternatively, the amount of coalescent or oligomer needed to achieve 40° F. failure-free coatings. LTFF should be less than 50° F. (10° C.), preferably less than 40° F. (5° C.). The distinction with LTFF is that other paint ingredients may have either an elevating influence (fillers, pigments) or depressing (surfactants, incidental solvents in additives) effect on LTFF relative to the MFT, which is measured on the latex alone. In turn, the MFT is measured from the wet state, and therefore includes the plasticizing effect of water, while the Tg is measured on an anhydrous sample of latex film, which does not include the water plasticizing effect. Latex paints are formulated to achieve LTFF of less than 50° F. (10° C.), preferably less than 40° C. (5° C.). It is also necessary for the final dried films to not be tacky at normal use temperatures (60°–110° F.). The polymeric binder comprises between about 3% and 30% by weight softening oligomer with the balance being matrix emulsion polymer.

Latex matrix polymers can be produced by copolymerizing ethylenic monomers in water where the monomers contain a free radical initiator and are polymerized in an aqueous polymerization medium by adding other emulsion polymerization ingredients. Initiators can include for example, typical free radical and redox types such as hydrogen peroxide, t-butyl hydroperoxide, di-t-butyl peroxide, benzoyl peroxide, benzoyl hydroperoxide, 2,4-dichlorobenzoyl peroxide, t-butyl peracetate, azobisisobutyronitrile, ammonium persulfate, sodium persulfate, potassium persulfate, sodium perphosphate, potassium perphosphate, isopropyl peroxycarbonate, and redox initiators such as sodium persulfate-sodium formaldehyde sulfoxylate, cumene hydroperoxide-sodium metabisulfite, potassium persulfate-sodium bisulfite, cumene hydroperoxide-iron (II) sulfate. Initiators such as persulfate, peroxide, and azo initiators can be added before or after in water. Redox catalysts can be added if desired. Polymerization can be accomplished by simply raising the suspension temperature to about 70° C. to 80° C. using persulfate initiators. Redox systems consist of oxidants and reductants, which can be mixed in any pair. Transition metals such as iron can be used as accelerators for initiators for redox couples. The polymerization initiators are usually added in amounts between about 0.1 to 2 weight percent based on the monomer additions.

Suitable anionic surfactants include for example, salts of fatty acids such as sodium and potassium salts of stearic, palmetic, oleic, lauric, and tall oil acids, salts of sulfated fatty alcohols, salts of phosphoric acid esters of polyethylated long chain alcohols and phenols. Preferred anionic surfactants include for example, alkylbenzene sulfonate salts such as sodium dodecylbenzene sulfonate and salts of hexyl, octyl, and higher alkyl diesters of 2-sulfosuccinic acid. Suitable non-ionic surfactants include polyoxyethylene glycols reacted with a lyophilic compound, ethylene oxide condensation products reacted with t-octylphenol or nonylphenol and known as "Triton" surfactants, polymerized oxyethylene (IgepalCA), ethylene oxide reacted with organic acids (Emulfor), or organic acid reacted with polyoxyamylene ether of stearic or oleic acid esters (Tweens).

A paint coating composition can be produced by combining the externally modified emulsion matrix polymer of this invention with pigments and other paint additives in a dispersing mill such as a Cowles disperser. A pigment dispersion can be preformed consisting of a dispersant and pigments on a disperser mill, a sand mill, a pebble mill, a roller mill, a ball mill or similar conventional grinding mill for milling the mineral pigments into the dispersion medium. The premix can then be combined under low shear with the polymeric binder of this invention and other paint additives as desired. Useful mineral pigments ordinarily include opacifying pigments such as titanium dioxide, zinc oxide, titanium calcium, as well as tinting pigments such as carbon black, yellow oxides, brown oxides, tan oxides, raw and burnt sienna or umber, chromium oxide green, phthalocyanine green, phthalonitrile blue, ultramarine blue, cadmium pigments, chromium pigments, and the like. Filler pigments such as clay, silica, talc, mica, wollastonite, wood flower, barium sulfate, calcium carbonate and the like can be added.

Historically, prior art paints achieved a balance of properties by making the latex slightly too hard for LTFF to achieve the tack-free character, and then temporarily softening the binder polymer with a coalescing solvent to achieve the desired LTFF. This solvent then evaporated from the film over a period of days, which allowed the restoration of tack-free character. If a binder copolymer containing an internal plasticizer is formulated to pass the LTFF test directly, the paint will be so tacky as to be unacceptable as a paint. However, by using non-volatile, external softening oligomers in accordance with this invention, the historical relationship between Tg (or MFT) and LTFF in the final paint can be changed such that both film formation and tack free character are simultaneously obtained without the need for a volatile coalescing solvent. The softening oligomer is permanent by design and will not volatilize out of the paint film.

The merits of this invention are further supported by the following illustrative examples.

COMPARATIVE EXAMPLES A AND B

A vinyl acetate and butyl acrylate 80/20 copolymer (Ex. A) and a vinyl acetate/butyl acrylate 60/40 copolymer (Ex. B) were produced from the following ingredients.

|    | Ex. A   | Ex. B   |                                |
|----|---------|---------|--------------------------------|
| a) | 2022 g  | 2022 g  | deionized water                |
|    | 7.2 g   | 7.2 g   | MM-80 (dihexylsodium sulfosuceil |
|    | 4.3 g   | 4.3 g   | ammonium acetate               |
|    | 5.4 g   | 5.4 g   | A246LD                         |
| b) | 28 g    | 28 g    | vinyl acetate                  |
|    | 7.0 g   | 7.0 g   | butyl acrylate                 |
|    | 0.7 g   | 0.7 g   | ammonium persulfate            |
| c) | 1360 g  | 1034 g  | vinyl acetate                  |
|    | 340 g   | 677 g   | butyl acrylate                 |
|    | 2.4 g   | 2.4 g   | acrylic acid                   |
| d) | 5.4 g   | 5.4 g   | ammonium persulfate            |
|    | 21 g    | 21 g    | A246L                          |
|    | 135 g   | 135 g   | deionized water                |
|    | 15 g    | 15 g    | NaAMPS                         |

Warm (a) to 71° C. under nitrogen with good stirring. Add (b) and allow exotherm to die (about 15 minutes). Pump in (c) and (d) in parallel over 5 hours. Hold 1 hour, and cool.

COMPARATIVE EXAMPLE

Comparisons of soft copolymer and coalesced hard copolymer (prior art) with the current invention are as follows.

Prior art. Conventionally, the balance of low temperature film formation and absence of tack at ambient temperature is achieved by utilizing a latex composition with an elevated Tg, to achieve absence of tack, and then temporarily reducing its Tg with a volatile coalescing solvent such as Texanol, to achieve low temperature film formation. While this works well, it also involves the emission of the coalescing solvent into the atmosphere, which contributes odor and air pollution. A typical copolymer composition comprises by weight 80% vinyl acetate and 20% butyl acrylate. For this experiment, that latex contained coalescing solvent at the level of 6% to achieve a KMFT of 10° C. A film cast with this coalesced latex was non-tacky at room temperature, but emitted volatile solvent to the atmosphere.

Conversely, if one makes a copolymer with a low enough Tg to achieve low temperature film formation (60/40 VA/BA), as in Example B above, the polymer forms a film which is excessively tacky at ambient use temperature. While this would involve no VOC emissions to the atmosphere, the coating involves a commercially unacceptable balance of properties. This soft copolymer achieves a KMFT of 10° C. on its own. A film cast from this latex is extremely tacky at room temperature, but emits no solvents to the atmosphere.

Present Invention. In the present invention, the use of a non-volatile external plasticizer accomplishes all three goals simultaneously: low temperature film formation, tack-free behavior at ambient temperatures, and no volatile organic emissions to the atmosphere.

EXAMPLE 1

A low molecular weight dipropylene-adipate oligomer polyester was synthesized at a —OH/—COOH equivalent ratio of 1.25 as follows:

1629.9 grams adipic acid
1870.1 grams dipropylene glycol
1.1 grams butyl stannoic acid The foregoing materials were charged to a flask equipped with a stirrer and heated up to 240° C. maximum under nitrogen along with water of reaction removal and held until a final Acid No. of 4 to 8 was obtained based on solids. The resulting polyester had ICI Cone & Plate viscosity 14–18 poise at 30° C., and a number average molecular weight of 800, and a Tg of –50° C.

The foregoing polyester was used to make an oligomeric pre-emulsion comprising by weight 62.5% polyester, 3.6% Triton X405 surfactant (70% active nonyl phenol ethoxylate), and 33.9% deionized water. This corresponds to 4% surfactant based on the weight of polyester. The pre-emulsion was formed by adding the polyester to the water/surfactant solution with ordinary agitation to form a premix, heating the premix above 45° C. to about 60° C., and then passing the heated premix through a Sonic Triplex Model T02-2A-HP ultrasonic emulsifier equipped with a 0.001 square inch orifice at 1000 psi. The resulting mixture was a stable, water dispersed, pre-emulsion of polyester oligomer having an emulsion particle size less than 0.7 microns. The oligomer pre-emulsion was then blended with 80/20 by weight vinyl acetate butyl acrylate copolymer (Example A above) having a Tg=10° C. at the level of 10% polyester based on the weight of oligomer and latex polymer solids or 800 grams latex 56.5% NV was mixed with 77.3 grams of polyester pre-emulsion. Blending of the oligomer pre-emulsion and latex was at room temperature, mixed thoroughly for about one hour, and then was allowed to set at room temperature for about 24 hours without further mixing. The oligomer modified latex provided an excellent semi-gloss latex paint.

EXAMPLE 2

In a manner similar to Example 1, a low molecular weight polyester prepolymer was prepared at a —OH/—COOH equivalent ratio of 1.186 as follows:

1675.1 grams adipic acid
1823.4 grams dipropylene glycol
0.5 grams triphenyl phosphine
1.1 grams butyl stannoic acid The polyester was synthesized at less than 240° C. to obtain a 4–8 Acid No. along with a 32–38 poise viscosity at 30° C., a number average molecular weight of 970, and a Tg of –50°

C. The oligomer pre-mix was micronized through a Sonolator to an emulsion particle size less than 0.7 microns. The oligomer pre-emulsion was mixed with the 80/20 vinyl acetate butyl acrylate copolymer latex in the manner of Example 1.

EXAMPLE 3

White semi-gloss latex paints were prepared from any one of the foregoing emulsion polymers described in Examples 1 or 5 from the following ingredients:

PIGMENT GRIND

| Group | Ingredient | Grams |
|---|---|---|
| A | Water | 151.68 |
| A | Thickener | .50 |
| A | Ammonia (28%) | .01 |
| B | Surfactant | 5.00 |
| C | Defoamer | 2.00 |
| C | Surfactant | 2.00 |
| D | TiO$_2$ pigment | 145.00 |
| D | Clay extender pigment | 50.00 |

Group A ingredients were added to Cowles dispersing equipment and mixed for 5 minutes. Group B and then C ingredients were added with continued mixing under slow agitation. Group D ingredients were added under high speed agitation and grind for 15 minutes or until a Hegman 5.5 was attained. The foregoing is the grind portion of the paint.

LETDOWN

| Group | Ingredient | Grams |
|---|---|---|
| E | Water | 33.00 |
| F | Water | 33.00 |
| F | Thickener | 3.50 |
| F | Ammonia Hydroxide | .01 |
| G | Preservative | 1.00 |
| H | Defoamer | 5.00 |
| H | Propylene glycol | 40.00 |
| H | Surfactant | 4.50 |
| H | Rheology Modifier (Ex. 1 or 2) | 9.00 |
| H | Surfactant | 3.00 |
| I | Latex (Ex. 1 or 2) | 393.00 |
| I | Opacifier latex | 105.00 |

Group E ingredients were added in separate vessel, followed by Premix F added to E ingredients with slow speed agitation. Group G ingredients were added at slow speed. Premix H ingredients were then added to vessel. Premix I ingredients were mixed for 30 minutes and then added to vessel. The final composition was mixed for 1 hour. The foregoing is the letdown portion of the paint.

LATEX PAINT

The letdown above were added to the pigment grind above under slow speed agitation and allowed to mix for 2 hours. Paint films from the foregoing latex paints were drawn down at 1 mil, air dried for at least 24 hours, and then tested for the following results:

| LTFF | Paint Ex. 1 | Paint Ex. 2 |
|---|---|---|
| 70° F. | pass | pass |
| 50° F. | pass | pass |
| 40° F. | pass | pass |

Dried paint films are considered to pass low temperature film formation (LTFF) if the dried coating has no tacking and is visible under ten-times magnification.

EXAMPLE 4

Following data was generated by blending an emulsion of an MPD/ADA modifier (methyl propane diol/adipic acid polyester of MW ca 1200) with the vinyl acetate homopolymer latex. The MPD/ADA oligomer modifier was prepared as in Example 1 by reacting:

877 gms of adipic acid 630.7 gms of 2-methyl-1,3-propane diol 0.2 gms of butylstanoic acid The emulsion was prepared as in Example 1 with a Ross ME-100L rotor-stator mixer, which produced a sub-micron pre-emulsion in size.

TABLE 1

| | Effect of Blended Modified on MFT | | |
|---|---|---|---|
| PCT Modifier (Ex. 4) | Initial (Ca. 30° C.) | After 24 Hours | After 5 Days |
| 20 | 20 | 13 | 18 |
| 30 | 13 | 9 | 14 |
| 40 | 10 | 7 | 10 |
| 0 | 35 | | |

As can be seen, oligomeric modifier appears to diffuse into the latex, lowering its MFT. The Fox Equation relationship appears to hold quite well for blends of compatible oligomers with latex, and the estimated fraction of the oligomeric modifier which diffused into the latex. Table 2 summarizes these calculations:

TABLE 2

| Estimated Extent of Diffusion | |
|---|---|
| PCT Modifier | Pct Diffused |
| 20 | 65 |
| 30 | 56 |
| 40 | 50 |

It was found that the foregoing MPD/ADA oligomeric modifier is effective as a film-forming modifier in accordance with this invention but is not as effective as the adipic acid dipropylene glycol polyester of Examples 1 and 2.

EXAMPLES 5–8

A series of polyester modifiers were prepared as follows:

TABLE 3

| | Ex. 5 | Ex. 6 | Ex. 7 | Ex. 8 |
|---|---|---|---|---|
| Neopentyl glycol | 416.8 | 312.6 | — | — |
| Azelaic acid | 564.6 | 376.4 | — | — |
| Adipic acid | — | — | 146.2 | 584.8 |

TABLE 3-continued

|  | Ex. 5 | Ex. 6 | Ex. 7 | Ex. 8 |
|---|---|---|---|---|
| Dipropylene glycol | — | — | 268.4 | — |
| Benzoic acid | — | — | 183.2 | — |
| 2-methyl-1,3-propane diol | — | — | — | 180.2 |
| 2-ethyl hexanol | — | — | — | 520.8 |
| Butyl stanoic acid | 0.2 | 0.2 | 0.2 | 0.4 |

Synthesize as in Example 1.

EXAMPLE 9

A polyester amide was prepared as follows:

13.4 g 2-methyl-1,5-pentane diamine 100.3 g DBE-3 (DuPont, dimethyl adipate)

77.4 g dipropylene glycol 0.1 g butyl stanoic acid

Heat under nitrogen with good agitation to about 20° C. Use a glass bead packed column to distill off methanol, keeping column head temperature at 65° C. Switch to a trap when distillation slows down. Cool after 4 hours at 200° C.

Emulsions of the modifiers were prepared as in Example 1 and blended with a commercial acrylic latex (8° C. Tg, DSC, methylmethacrylate-butyl acrylate) and a styrene latex (37° C. Tg, DSC, styrene-ethyl-acrylate) as follows:

PAINT FORMULA

A) Premix the following components:

|  | Grams |
|---|---|
| water | 200 |
| cellulosic thickener | 1.0 |
| preservative | 2.0 |
| defoamer | 1.0 |
| polymeric dispersant | 6.0 |
| surfactant | 4.0 |

B) Add the following to (A) and disperse 5 minutes at moderate speed:

|  | Grams |
|---|---|
| titanium dioxide | 162.7 |
| extender pigment | 132.65 |
| crystalline silica | 85.65 |
| colloidal silicate | 2.00 |

C) Add the following to (A) and (B) mixture and mix 15 minutes at high speed:

|  | Grams |
|---|---|
| water | 100 |
| defoamer | 2.0 |

D) Premix the following and then add to the above and mix 15 minutes at low speed:

|  | Grams |
|---|---|
| water | 60.0 |
| cellulosic thickener | 4.5 |

E) Add the following and mix 15 minutes moderate speed:

|  | Grams |
|---|---|
| modified latex | 264 |

F) Add the following components to the above mixture:

|  | Grams |
|---|---|
| Water | 70 |
| defoamer | 3.0 |
| polyurethane associative thickener | 10.0 |

TABLE 4

| Acrylic Latex: | | |
|---|---|---|
| Example | Modifier | 40° F. LTFF |
| 10 | 5% Example 5 | pass |
| 11 | 5% Example 6 | pass |
| 12 | 5% Example 7 | pass |
| 13 | 5% Example 8 | pass |
| 14 | 5% Example 9 | pass |
| 15 | None | fail |

| Styrene Latex: | | |
|---|---|---|
| Example | Modifier | 70° F. LTFF |
| 16 | Example 7 | pass |
| 17 | None | fail |

We claim:

1. A process for producing an aqueous dispersed., ambient dry paint coating composition containing a polymeric binder free of volatile organic coalescing solvent, the process steps for producing the polymeric binder comprising:

preparing a low molecular weight oligomeric modifier having a number average molecular weight between 300 and 5,000 and a Tg less than −20° C., the oligomeric modifier selected from a polyurethane and a polyester;

heating a mixture of the oligomeric modifier, water, and surfactant to a temperature between about 45° C. and 100° C. to provide a heated aqueous mixture containing between 40% and 70% by weight oligomeric modifier;

micronizing by high shear mixing the heated aqueous mixture to produce a preformed micronized, aqueous micro-emulsion of oligomeric modifier having an organic phase droplet size less than 1 micron; and mixing the preformed micro-emulsion of oligomer with a preformed aqueous emulsion of addition copolymer of copolymerized ethylenically unsaturated monomers to produce a polymeric binder containing by weight between 3% and 30% oligomeric modifier, where the polymeric binder has a Tg less than 20° C.

2. The process of claim 1 where the micronizing produces organic phase particle size droplets less than 0.7 microns.

3. The process of claim 1 where the micro-emulsion is formed at temperatures between about 45° C. and 60° C.

4. The process of claim 1 where the oligomer has a molecular weight between 500 and 2,000.

5. The process of claim 1 where the oligomer has a Tg less than −40° C.

6. The process of claim 1 where the oligomer has a Tg less than −50° C.

7. The process of claim 1 where the emulsion polymer comprises emulsion copolymerized vinyl acetate to produce an oligomeric modified emulsion polymer.

8. A process for producing an aqueous dispersed, ambient dry paint coating composition containing a polymeric binder free of volatile organic coalescing solvent, the process comprising:

preparing a low molecular weight oligomeric modifier having a number average molecular weight between 300 and 5,000 and a Tg less than −20° C., the oligomeric modifier selected from a polyurethane and a polyester;

heating the oligomeric modifier with water and surfactant to a temperature between 20° C. and 100° C. to provide a heated aqueous mixture containing between 40% and 70% by weight oligomeric modifier;

micronizing by high shear mixing the heated aqueous mixture to produce a preformed, micronized, aqueous micro-emulsion of oligomeric modifier having an organic phase droplet size less than 10 microns; and mixing the preformed micro-emulsion with an aqueous emulsion of addition copolymer of copolymerized ethylenically unsaturated monomers to produce a polymeric binder containing be weight between 3% and 30% oligomeric modifier, where the polymeric binder has a Tg less than 20° C.

* * * * *